(12) United States Patent
Bu

(10) Patent No.: US 11,144,170 B2
(45) Date of Patent: Oct. 12, 2021

(54) DISPLAY PANEL AND DISPLAY MODULE

(71) Applicant: Wuhan China Star Optoelectronics Semiconductor Display Technology Co., Ltd., Wuhan (CN)

(72) Inventor: Chenghao Bu, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/603,245

(22) PCT Filed: Mar. 18, 2019

(86) PCT No.: PCT/CN2019/078429
§ 371 (c)(1),
(2) Date: Oct. 7, 2019

(87) PCT Pub. No.: WO2020/124823
PCT Pub. Date: Jun. 25, 2020

(65) Prior Publication Data
US 2020/0192507 A1 Jun. 18, 2020

(30) Foreign Application Priority Data
Dec. 17, 2018 (CN) .......................... 201811545437.8

(51) Int. Cl.
*G06F 3/047* (2006.01)
*G02F 1/1362* (2006.01)
*G02F 1/1343* (2006.01)
*G02F 1/1333* (2006.01)

(52) U.S. Cl.
CPC .......... *G06F 3/047* (2013.01); *G02F 1/13439* (2013.01); *G02F 1/133345* (2013.01); *G02F 1/136286* (2013.01); *G02F 1/136295* (2021.01); *G06F 2203/04103* (2013.01)

(58) Field of Classification Search
CPC ........... G06F 3/047; G06F 2203/04103; G02F 1/133345; G02F 1/13439; G02F 1/136286; G02F 2001/136295
USPC ....................................................... 345/156
See application file for complete search history.

(56) References Cited

U.S. PATENT DOCUMENTS

| 2017/0262109 A1* | 9/2017 | Choi | .................. H01L 51/56 |
| 2017/0277326 A1 | 9/2017 | Cao et al. | |
| 2017/0287936 A1* | 10/2017 | Kim | .................. H01L 27/3279 |
| 2018/0301482 A1* | 10/2018 | Hao | .................. H01L 27/124 |

(Continued)

FOREIGN PATENT DOCUMENTS

| CN | 103984435 | 8/2014 |
| CN | 107390941 | 11/2017 |

(Continued)

*Primary Examiner* — Amare Mengistu
*Assistant Examiner* — Gloryvid Figueroa-Gibson

(57) ABSTRACT

The present disclosure provides a display panel and a display module. The display panel includes a display area; a non-display area surrounding the display area, wherein the non-display area includes a bending area adjacent to the display area and a bonding area away from the display area; and a power line, wherein the power line includes a first type of power line and a second type of power line positioned in the bending area; wherein the first type of power line and the second type of power line are disposed at different layers in the bending area.

12 Claims, 9 Drawing Sheets

(56) References Cited

U.S. PATENT DOCUMENTS

| | | | |
|---|---|---|---|
| 2018/0349665 A1* | 12/2018 | He | H01L 27/3234 |
| 2018/0358572 A1 | 12/2018 | Harada et al. | |
| 2019/0018526 A1* | 1/2019 | Fu | H01L 27/3276 |
| 2019/0056811 A1 | 2/2019 | Wang | |
| 2020/0166791 A1* | 5/2020 | Chen | H01L 29/78669 |

FOREIGN PATENT DOCUMENTS

| | | |
|---|---|---|
| CN | 107783698 | 3/2018 |
| CN | 108831910 | 11/2018 |
| CN | 109065571 | 12/2018 |

\* cited by examiner

DISPLAY PANEL AND DISPLAY MODULE

RELATED APPLICATIONS

This application is a National Phase of PCT Patent Application No. PCT/CN2019/078429 having International filing date of Mar. 18, 2019, which claims the benefit of priority of Chinese Patent Application No. 201811545437.8 filed on Dec. 17, 2018. The contents of the above applications are all incorporated by reference as if fully set forth herein in their entirety.

FIELD AND BACKGROUND OF THE INVENTION

The present disclosure relates to a field of display technology, and more particularly, to a display panel and a display module.

Because organic light-emitting diode (OLED) displays have advantages such as light weight, self-illumination, short response times, wide viewing angles, wide color gamut, high brightness, and low power consumption among various types of display techniques, OLED displays, succeeding liquid crystal displays, have become the third generation display technique.

With development of display techniques, users are getting more and more unsatisfied with appearance of display panels. For example, in users' points of view, display panels should have a narrow edge frame design. In prior art, a lower edge frame of display panels refers to an interval between a bottom side of a display area and a central line of a bending area, where VDD wirings and fan-out data or signal lines having wide width are included therein. This makes display panels to have a wide lower edge frame.

SUMMARY OF THE INVENTION

The present disclosure provides a display panel and a display module in order to solve the problems existing in conventional display panels, where the display panels have a wide lower edge frame.

To solve the above-said problems, the present disclosure provides the following technical schemes.

The present disclosure provides a display panel, comprising:

a display area;

a non-display area surrounding the display area, wherein the non-display area includes a bending area adjacent to the display area and a bonding area away from the display area; and a power line, wherein the power line includes a first type of power line and a second type of power line positioned in the bending area;

wherein the first type of power line and the second type of power line are disposed at different layers in the bending area.

In the display panel of the present disclosure, the non-display area includes a first region and a second region positioned at two sides of the bending area, the first region is adjacent to the display area, and the second region is away from the display area; and wherein the power line includes a first uniform voltage portion positioned in the first region and a second uniform voltage portion positioned in the second region, and the first uniform voltage portion and the second uniform voltage portion extend towards the bonding area.

In the display panel of the present disclosure, a substrate, the first type of power line disposed on the substrate, a first organic filling layer disposed on the first type of power line, a second type of power line disposed on the first organic filling layer, and a second organic filling layer disposed on the second type of power line are positioned in the bending area.

In the display panel of the present disclosure, the substrate, a first metal layer disposed on the substrate, a second metal layer disposed on the first metal layer, and a third metal layer disposed on the second metal layer are positioned in the display area; and wherein the first type of power line and the second metal layer are formed in a same photomask process, and the second type of power line and the third metal layer are formed in a same photomask process.

In the display panel of the present disclosure, the first type of power line is a VDD signal line, and the second type of power line is a data signal line.

In the display panel of the present disclosure, the first type of power line includes a first signal line and a second signal line;

a substrate, the first signal line disposed on the substrate, a first organic filling layer disposed on the first signal line, a second signal line disposed on the first organic filling layer, a second organic filling layer disposed on the second signal line, the second type of power line disposed on the second organic filling layer, and a third organic filling layer disposed on the second type of power line are positioned in the bending area.

In the display panel of the present disclosure, the substrate, a first metal layer disposed on the substrate, a second metal layer disposed on the first metal layer, and a third metal layer disposed on the second metal layer are positioned in the display area; and wherein the first signal line and the first metal layer are formed in a same photomask process, the second signal line and the second metal layer are formed in a same photomask process, and the second type of power line and the third metal layer are formed in a same photomask process.

In the display panel of the present disclosure, the first type of power line is a Vdata signal line, and the second type of power line is a VDD signal line; and wherein the VDD signal line and the data signal line extends from the bending area to the bonding area.

In the display panel of the present disclosure, the display panel further comprises a VSS signal line, and the VSS signal line extends from the display area to the bonding area; and wherein the VSS signal line and the VDD signal line are formed in a same photomask process.

In the display panel of the present disclosure, the display panel further comprises a GOA signal line;

wherein the GOA signal line is positioned at two sides of the display panel, and is positioned between the display area and the VSS signal line;

wherein the GOA signal line extends from the display area to the non-display area; and wherein the GOA signal line is insulated from the VSS signal line, the data signal line, and the VDD signal line.

In addition, the present disclosure provides a display module, wherein the display module comprises a display panel and a polarizer layer and a cover layer disposed on the display panel, the display panel comprising:

a display area;

a non-display area surrounding the display area, wherein the non-display area includes a bending area adjacent to the display area and a bonding area away from the display area; and a power line, wherein the power line includes a first type of power line and a second type of power line positioned in the bending area;

wherein the first type of power line and the second type of power line are disposed at different layers in the bending area.

In the display module of the present disclosure, the non-display area includes a first region and a second region positioned at two sides of the bending area, the first region is adjacent to the display area, and the second region is away from the display area; and wherein the power line includes a first uniform voltage portion positioned in the first region and a second uniform voltage portion positioned in the second region, and the first uniform voltage portion and the second uniform voltage portion extend towards the bonding area.

In the display module of the present disclosure, a substrate, the first type of power line disposed on the substrate, a first organic filling layer disposed on the first type of power line, a second type of power line disposed on the first organic filling layer, and a second organic filling layer disposed on the second type of power line are positioned in the bending area.

In the display module of the present disclosure, the substrate, a first metal layer disposed on the substrate, a second metal layer disposed on the first metal layer, and a third metal layer disposed on the second metal layer are positioned in the display area; and wherein the first type of power line and the second metal layer are formed in a same photomask process, and the second type of power line and the third metal layer are formed in a same photomask process.

In the display module of the present disclosure, the first type of power line is a VDD signal line, and the second type of power line is a data signal line.

In the display module of the present disclosure, the first type of power line includes a first signal line and a second signal line;

a substrate, the first signal line disposed on the substrate, a first organic filling layer disposed on the first signal line, a second signal line disposed on the first organic filling layer, a second organic filling layer disposed on the second signal line, the second type of power line disposed on the second organic filling layer, and a third organic filling layer disposed on the second type of power line are positioned in the bending area.

In the display module of the present disclosure, the substrate, a first metal layer disposed on the substrate, a second metal layer disposed on the first metal layer, and a third metal layer disposed on the second metal layer are positioned in the display area; and wherein the first signal line and the first metal layer are formed in a same photomask process, the second signal line and the second metal layer are formed in a same photomask process, and the second type of power line and the third metal layer are formed in a same photomask process.

In the display module of the present disclosure, the first type of power line is a data signal line, and the second type of power line is a VDD signal line; and wherein the VDD signal line and the data signal line extends from the bending area to the bonding area.

In the display module of the present disclosure, the display panel further comprises a VSS signal line, and the VSS signal line extends from the display area to the bonding area; and wherein the VSS signal line and the VDD signal line are formed in a same photomask process.

In the display module of the present disclosure, the display panel further comprises a GOA signal line;

wherein the GOA signal line is positioned at two sides of the display panel, and is positioned between the display area and the VSS signal line;

wherein the GOA signal line extends from the display area to the non-display area; and wherein the GOA signal line is insulated from the VSS signal line, the data signal line, and the VDD signal line.

Advantageous Effects

According to the present disclosure, the fan-out lines extending from the display area to the bending area are removed, and a part of the power line in the display area is arranged to directly cross the bending area. Therefore, the interval between the display area and the bending area is shortened, further narrowing the lower edge frame of display panels.

BRIEF DESCRIPTION OF THE SEVERAL VIEWS OF THE DRAWINGS

To detailedly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DESCRIPTION OF SPECIFIC EMBODIMENTS OF THE INVENTION

Figure 1:
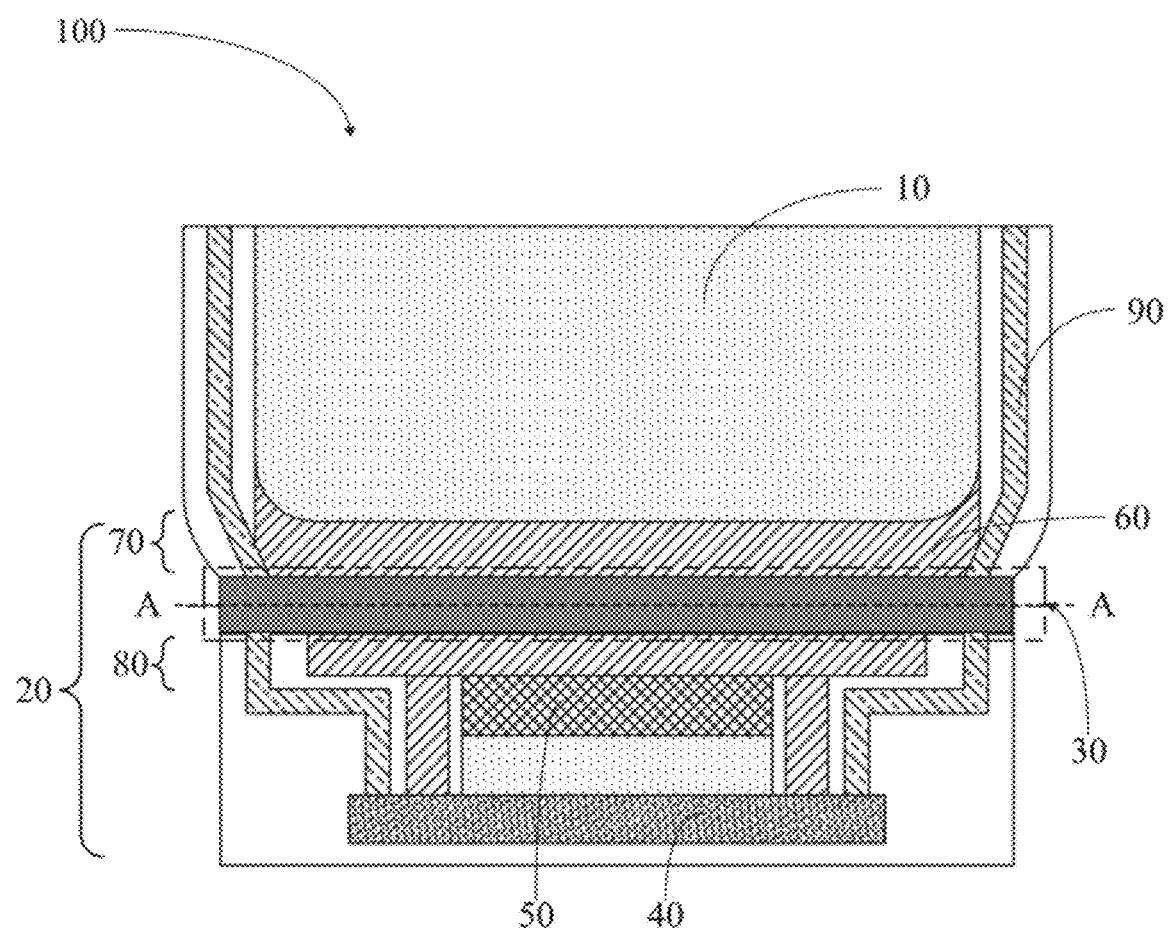
FIG. 1 shows a top view of a display panel according to EMBODIMENT ONE of the present disclosure.

The following embodiments refer to the accompanying drawings for exemplifying specific implementable embodiments of the present disclosure. Moreover, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto. In the drawings, the same reference symbol represents the same or similar components.

As used herein, the term "VDD" is used to define a first constant voltage and the term "VSS" is used to define a second constant voltage which is less than the first constant voltage.

Embodiment One

Please refer to FIG. 1, which shows a top view of a display panel according to EMBODIMENT ONE of the present disclosure.

The display panel 100 includes a display area 10 and a non-display area 20 surrounding the display area. The non-display area 20 includes a bending area 30 adjacent to the display area 10 and a bonding area 40 away from the display area 10.

The display panel 100 further includes a power line. The power line extends from the display area 10 to the non-display area 20. The power line includes a first type of power line 50 and a second type of power line 60 positioned in the bending area 30. The first type of power line 50 and the second type of power line 60 are disposed at different layers in the bending area 30.

As can be seen in FIG. 1, the non-display area 20 includes a first region 70 and a second region 80 positioned at two sides of the bending area 30. The first region 70 is adjacent to the display area 10, and the second region 80 is away from the display area 10.

The power line includes a first uniform voltage portion positioned in the first region 70 and a second uniform voltage portion positioned in the second region 80. The first uniform voltage portion and the second uniform voltage portion extend towards the bonding area 40.

In one embodiment, the first type of power line 50 and the second type of power line 60 are positioned in the first region 70 and the second region 80. The first type of power line 50 and the second type of power line 60 are disposed at different layers in the first region 70 and the second region 80.

The power line includes a VDD signal line and a data signal line.

The first type of power line 50 is one of the VDD signal line and the data signal line, and the second type of power line 60 is the other of the VDD signal line and the data signal line.

The VDD signal line includes a VDD uniform voltage portion positioned in the bending area 30. The data signal line includes a data uniform voltage portion positioned in the bending area 30.

In one embodiment, the VDD signal line and the data signal line are disposed at different layers. At least one insulation layer is disposed between the first type of power line 50 and the second type of power line 60 to insulate the same from each other and to prevent occurrence of short connection therebetween.

In one embodiment, the insulation layer includes an organic layer made of an organic material.

Because the first type of power line 50 and the second type of power line 60 are disposed at different layers, arrangement of the data and signal lines positioned in the first region 70 is simplified, and an interval between the display area 10 and the bending area 30 is shortened. Therefore, a narrow edge frame design is realized.

Figure 2:
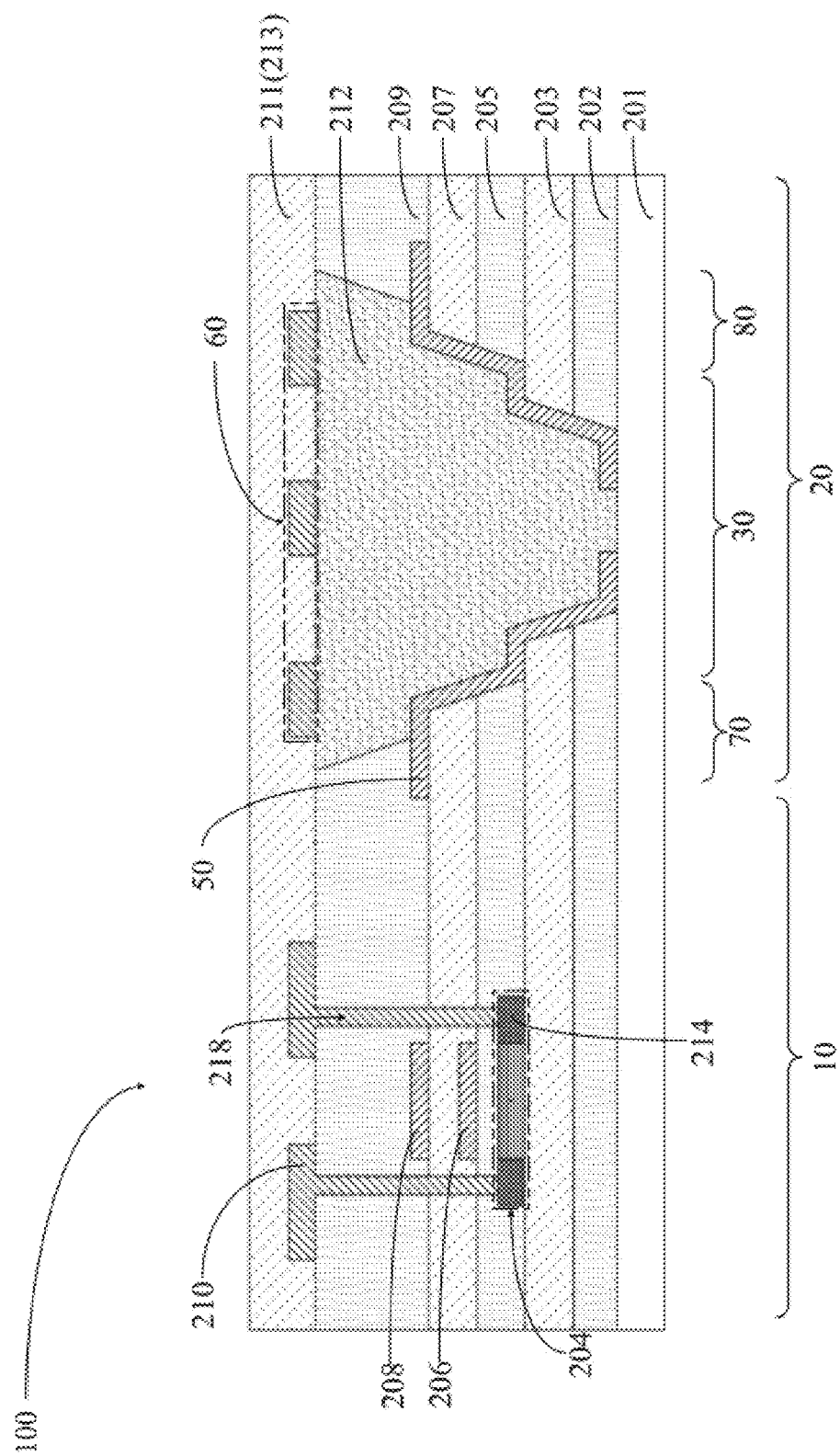
FIG. 2 shows a cross-sectional view of a structure of the display panel according to EMBODIMENT ONE of the present disclosure.

Please refer to FIG. 2, which shows a cross-sectional view of a structure of the display panel according to EMBODIMENT ONE of the present disclosure.

A substrate 201 and a thin film transistor (TFT) layer disposed on the substrate 201 are positioned in the display area 10. The TFT layer includes a barrier layer 202, a buffer layer 203, an active layer 204, a first gate insulation layer 205, a first metal layer 206, a second gate insulation layer 207, a second metal layer 208, an interlayer dielectric layer 209, a third metal layer 210, and a planarization layer 211.

In one embodiment, the substrate 201 is a flexible substrate. The flexible substrate is made of material including polyimide.

The barrier layer 202 is disposed on the substrate 201.

In one embodiment, the barrier layer 202 has a thickness of 500 nm.

In one embodiment, the barrier layer 202 is made of material including silicon oxide.

The buffer layer 203 is formed on the barrier layer 202, so as to serve as a buffer to release stress between heterostructures of different layers, and to function to block water and oxygen.

In one embodiment, the buffer layer 203 has a thickness of 350 nm.

In one embodiment, the buffer layer 203 is made of material including silicon nitride, silicon oxide, or combination thereof.

The active layer 204 is formed on the buffer layer 203. The active layer 204 includes a doped region 214 that is doped with ions.

In one embodiment, the active layer 204 has a thickness of 50 nm.

The first gate insulation layer 205 is formed on the active layer 204. The first gate insulation layer 205 covers the active layer 204. The first gate insulation layer 205 is configured to insulate the active layer 204 from the metal layer disposed above the active layer 204.

In one embodiment, the first gate insulation layer 205 has a thickness of 130 nm.

The first metal layer 206 is formed on the first gate insulation layer 205.

The first metal layer 206 functions as a gate electrode of the display panel 100. The gate electrode is made of metal, such as molybdenum, aluminum, an aluminum-nickel alloy, a molybdenum-tungsten alloy, chromium, copper, or any combinations thereof.

In one embodiment, the first metal layer 206 is made of molybdenum.

In one embodiment, the first metal layer 206 has a thickness of 250 nm.

The second gate insulation layer 207 is formed on the first metal layer 206. The second gate insulation layer 207 is configured to insulate the first metal layer 206 from the second metal layer 208.

In one embodiment, the first gate insulation layer 205 and the second gate insulation layer 207 are made of silicon nitride, silicon oxide, or silicon oxynitride.

In one embodiment, the second gate insulation layer 207 has a thickness of 110 nm.

The second metal layer 208 is formed on the second gate insulation layer 207.

The interlayer dielectric layer 209 is formed on the second metal layer 208. The interlayer dielectric layer 209 covers the second metal layer 208, and is configured to insulate the second metal layer 208 from the third metal layer 210.

In one embodiment, the interlayer dielectric layer 209 is made of material that is the same as material used to form the first gate insulation layer 205 and the second gate insulation layer 207.

In one embodiment, the interlayer dielectric layer 209 has a thickness of 500 nm.

The third metal layer 210 is formed on the interlayer dielectric layer 209.

The third metal layer 210 functions as a source and drain electrode of the display panel 100. The source and drain electrode is made of metal, such as molybdenum, aluminum, an aluminum-nickel alloy, a molybdenum-tungsten alloy, chromium, copper, a titanium-aluminum alloy, or any combinations thereof.

The third metal layer 210 is electrically connected to the doped region 214 via a third through-hole 218.

In one embodiment, the second metal layer 208 and the third metal layer 210 are made of a titanium-aluminum alloy.

In one embodiment, for the second metal layer 208 and the third metal layer 210, a first layer therein that is made of titanium has a thickness of 80 nm, a second layer therein that is made of aluminum has a thickness of 600 nm, and a third layer therein that is made of titanium has a thickness of 80 nm.

The planarization layer 211 is formed on the third metal layer 210 to ensure a planar surface of a layered structure of an array substrate.

The display panel 100 further includes a light-emitting device layer (not shown) and an encapsulation layer (not shown) formed on the planarization layer 211.

Please refer to FIG. 2. The substrate 201, the first type of power line 50 disposed on the substrate 201, a first organic filling layer 212 disposed on the first type of power line 50, a second type of power line 60 disposed on the first organic filling layer 212, and a second organic filling layer 213 (i.e., the planarization layer 211) disposed on the second type of power line 60 are positioned in the bending area 30.

The depth of a hole that is filled with the first organic filling layer 212 is equal to the interval between the substrate 201 and the third metal layer 210.

In one embodiment, the first organic filling layer 212 has a thickness of 2 μm.

In one embodiment, the first type of power line 50 and the second metal layer 208 are formed in a same photomask process, and the second type of power line 60 and the third metal layer 210 are formed in a same photomask process.

In one embodiment, the first type of power line 50 is the VDD signal line, and the second type of power line 60 is the data signal line. The VDD signal line and the second metal layer 208 are formed in a same photomask process, and the data signal line and the third metal layer 210 are formed in a same photomask process.

The data signal line extends from the display area 10 to the non-display area 20, and directly crosses the bending area 30 via the data uniform voltage portion, and is connected to the bonding area 40. The VDD signal line extends from the display area 10 to the non-display area 20, and extends from the side adjacent to the substrate 201 to the bending area 30 via the VDD uniform voltage portion, and is connected to the bonding area 40.

Please see FIG. 1. The display panel further includes a VSS signal line 90.

The VSS signal line 90 is disposed at outer region of the non-display area 20, and is close to peripheral circumference of edge frame of the display panel 100. The VSS signal line 90 extends from the display area 10 to the bonding area 40 by passing through the bending area 30.

In one embodiment, the VSS signal line 90 and the VDD signal line are formed in a same photomask process. The VSS signal line 90 and the second metal layer 208 are formed in a same photomask process. The VSS signal line 90 and the VDD signal line positioned in the bending area 30, after being patterned, facilitate in reducing stress generated by bending of signal lines, thus avoiding break of metal lines.

The display panel 100 further includes a gate driver on array (GOA) signal line (not shown).

The GOA signal line is positioned at two sides of the display panel 100, and is positioned between the display area 10 and the VSS signal line 90.

The GOA signal line extends from the display area 10 to the non-display area 20. The GOA signal line is insulated from the VSS signal line 90, the data signal line, and the VDD signal line.

In prior art, the second metal layer 208 is generally made of molybdenum, and the source and drain electrode is generally made of a titanium-aluminum alloy. The titanium-aluminum alloy is more flexible than molybdenum, and would be difficult to be broken while being bent. Thus, the data lines extending into the bending area 30 have to be replaced with metal materials used to form the source and drain electrode that is much more flexible. And, the data lines, after passing through the bending area 30, have to be replaced back with the material used to form the second metal layer 208.

In comparison, according to the present invention, the metal material used to form the second metal layer is directly replaced with the metal material that is the same as that used to form the source and drain electrode. This increases flexibility of metal lines. The present disclosure not only omits the requirement of changing metal line material but also simplifying the manufacturing process.

The first type of power line 50 is disposed between the first organic filling layer 212 and the substrate 201, and is disposed at a layer different from the layer where the second type of power line 60 is disposed. In other words, the signals are transmitted at different layers. This not only avoids occurrence of short connection but also signal interference between the VDD signal line and the data signal line.

A method for manufacturing the display panel according to EMBODIMENT ONE of the present disclosure is provided below.

Please refer to FIGS. 3A-3E, which show each stage in a process flow of a method for manufacturing the display panel according to EMBODIMENT ONE of the present disclosure.

Figure 3A:
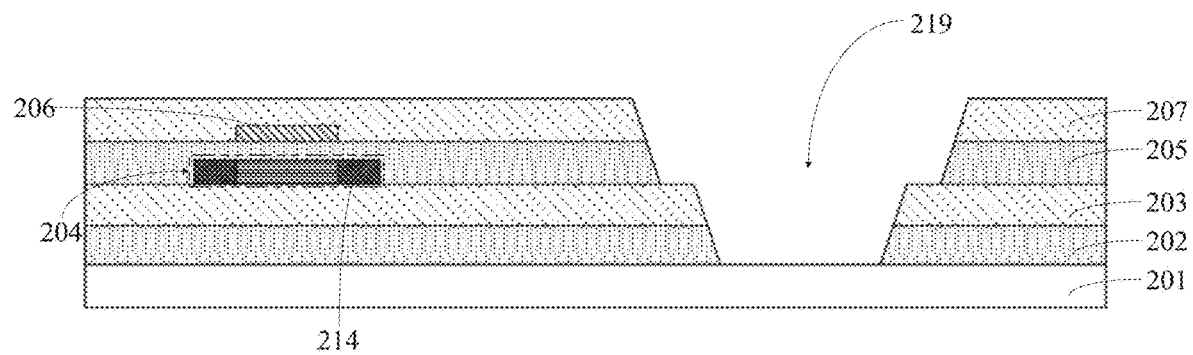
FIGS. 3A, 3B, 3C, 3D, and 3E show each stage in a process flow of a method for manufacturing the display panel according to EMBODIMENT ONE of the present disclosure.

Please see FIG. 3A. The substrate 201 is provided. The barrier layer 202, the buffer layer 203, the active layer 204, the first gate insulation layer 205, the first metal layer 206, and the second gate insulation layer 207 are sequentially formed on the substrate 201.

In one embodiment, the substrate 201 is a flexible substrate. The flexible substrate is made of material including polyimide.

The barrier layer 202 is disposed on the substrate 201.

In one embodiment, the barrier layer 202 has a thickness of 500 nm.

In one embodiment, the barrier layer 202 is made of material including silicon oxide.

The buffer layer 203 is formed on the barrier layer 202, so as to serve as a buffer to release stress between heterostructures of different layers, and to function to block water and oxygen.

In one embodiment, the buffer layer 203 has a thickness of 350 nm.

In one embodiment, the buffer layer 203 is made of material including silicon nitride, silicon oxide, or combination thereof.

The active layer 204 is formed on the buffer layer 203. The active layer 204 includes the doped region 214 that is doped with ions.

In one embodiment, the active layer 204 has a thickness of 50 nm.

The first gate insulation layer 205 is formed on the active layer 204. The first gate insulation layer 205 covers the active layer 204. The first gate insulation layer 205 is configured to insulate the active layer 204 from the metal layer disposed above the active layer 204.

In one embodiment, the first gate insulation layer 205 has a thickness of 130 nm.

The first metal layer 206 is formed on the first gate insulation layer 205.

The first metal layer 206 functions as a gate electrode of the display panel 100. The gate electrode is made of metal, such as molybdenum, aluminum, an aluminum-nickel alloy, a molybdenum-tungsten alloy, chromium, copper, or any combinations thereof.

In one embodiment, the first metal layer 206 is made of molybdenum.

In one embodiment, the first metal layer 206 has a thickness of 250 nm.

The second gate insulation layer 207 is formed on the first metal layer 206. The second gate insulation layer 207 is configured to insulate the first metal layer 206 from the second metal layer 208.

In one embodiment, the first gate insulation layer 205 and the second gate insulation layer 207 are made of silicon nitride, silicon oxide, or silicon oxynitride.

In one embodiment, the second gate insulation layer 207 has a thickness of 110 nm.

As can be seen in FIG. 3A, the method further includes forming a recess (i.e., a first recess 219) in the bending area 30.

In one embodiment, the depth of the first recess 219 is equal to the sum of depth of the barrier layer 202, the buffer layer 203, the first gate insulation layer 205, and the second gate insulation layer 207.

In one embodiment, an opening area of the first recess 219 is gradually reduced in the direction extending from the second gate insulation layer 207 to the substrate 201.

Figure 3B:
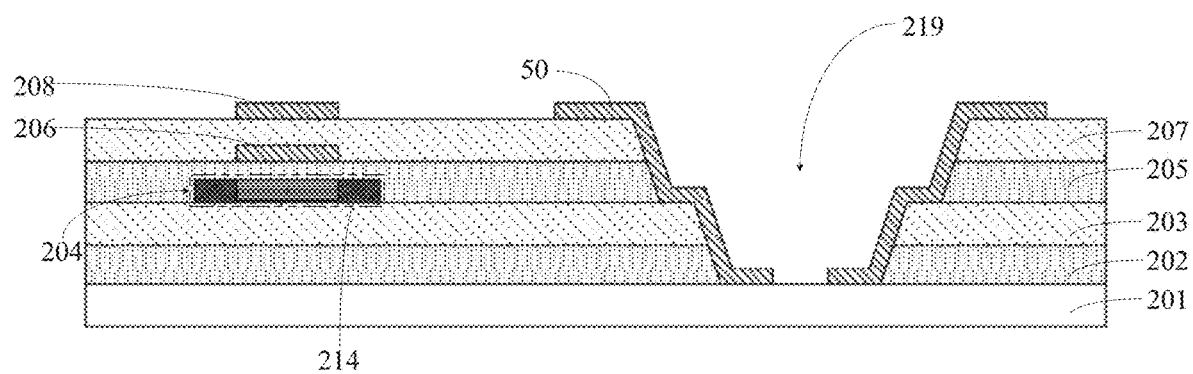

Please see FIG. 3B. The second metal layer 208 and the first type of power line 50 positioned in the bending area 30 are simultaneously formed on the second gate insulation layer 207.

Figure 3C:
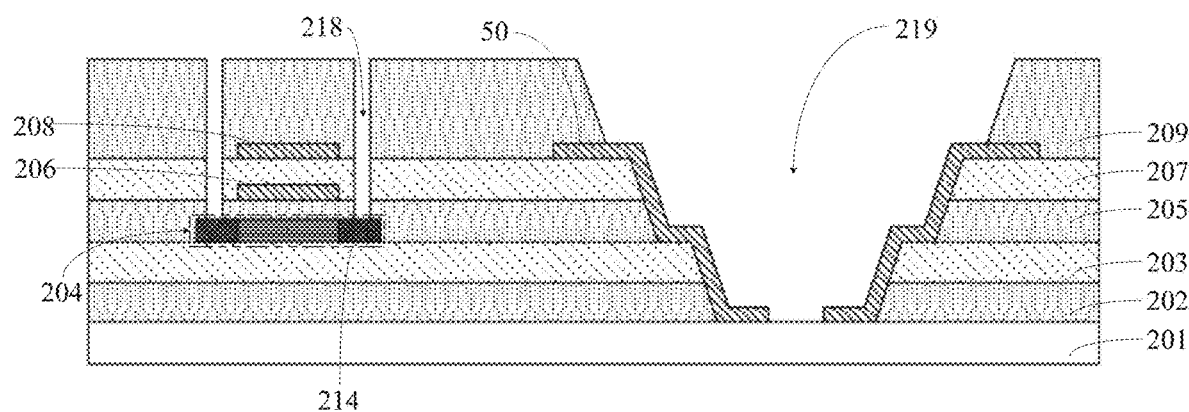

Please see FIG. 3C. The interlayer dielectric layer 209 and the third through-hole 219 are formed on the second metal layer 208, wherein the interlayer dielectric layer 209 does not cover the first recess 219.

In one embodiment, the interlayer dielectric layer 209 is made of material that is the same as material used to form the first gate insulation layer 205 and the second gate insulation layer 207.

In one embodiment, the interlayer dielectric layer 209 has a thickness of 500 nm.

Figure 3D:
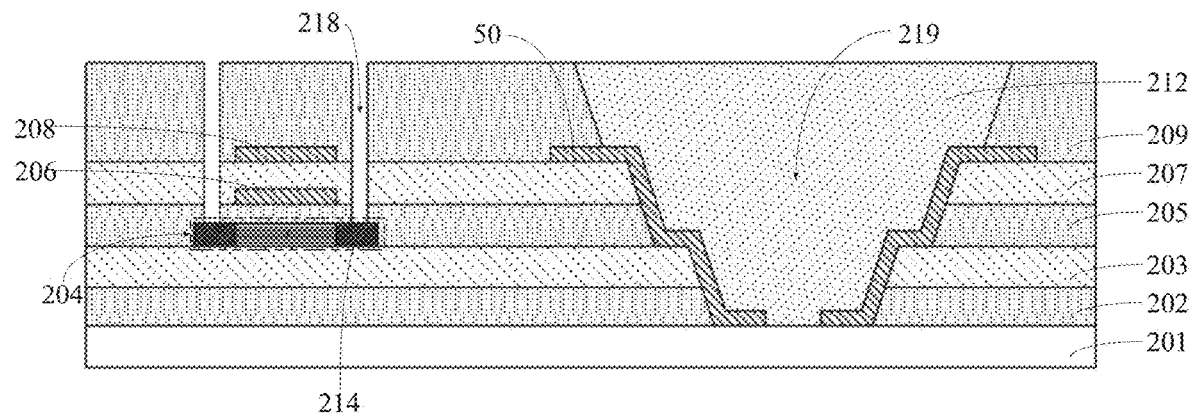

Please see FIG. 3D. The first recess 219 is filled with the first organic filling layer 212, wherein the first organic filling layer 212 has a top surface flush with a top surface of the interlayer dielectric layer 209.

The depth of the first recess 219 is filled with the first organic filling layer 212 is equal to the interval between the substrate 201 and the third metal layer 210.

In one embodiment, the first organic filling layer 212 has a thickness of 2 μm.

Figure 3E:
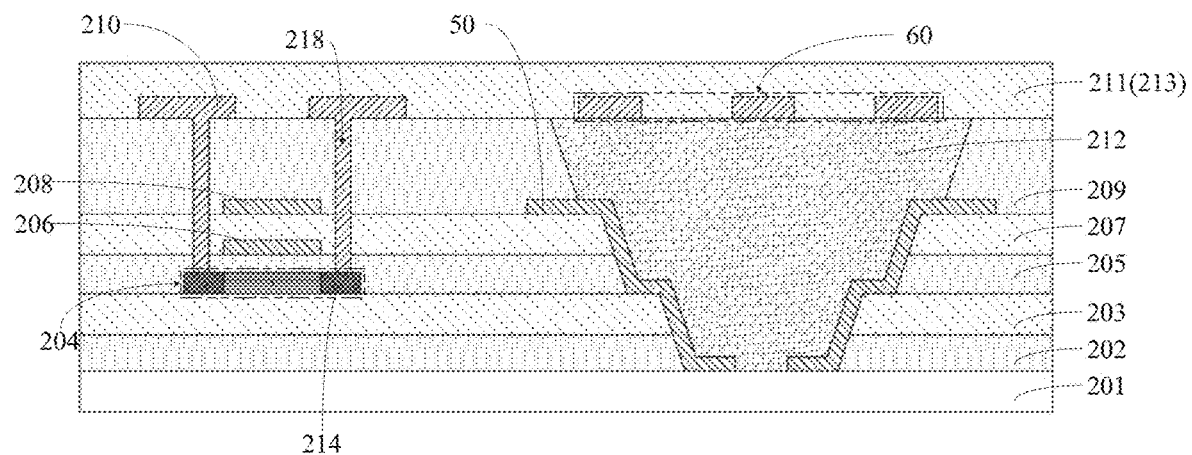

Please see FIG. 3E. The third metal layer 210 and the second type of power line 60 positioned in the bending area 30 are simultaneously formed on the interlayer dielectric layer 209.

The third metal layer 210 functions as a source and drain electrode of the display panel 100. the source and drain electrode is made of metal, such as molybdenum, aluminum, an aluminum-nickel alloy, a molybdenum-tungsten alloy, chromium, copper, a titanium-aluminum alloy, or any combinations thereof.

The third metal layer 210 is electrically connected to the doped region 214 via a third through-hole 218.

In one embodiment, the second metal layer 208 and the third metal layer 210 are made of a titanium-aluminum alloy.

In one embodiment, for the second metal layer 208 and the third metal layer 210, a first layer therein that is made of titanium has a thickness of 80 nm, a second layer therein that is made of aluminum has a thickness of 600 nm, and a third layer therein that is made of titanium has a thickness of 80 nm.

Finally, the planarization layer 211 is formed on the third metal layer 210, and the light-emitting device layer (not shown) and the encapsulation layer (not shown) are formed on the planarization layer 211.

Embodiment Two

Figure 4:
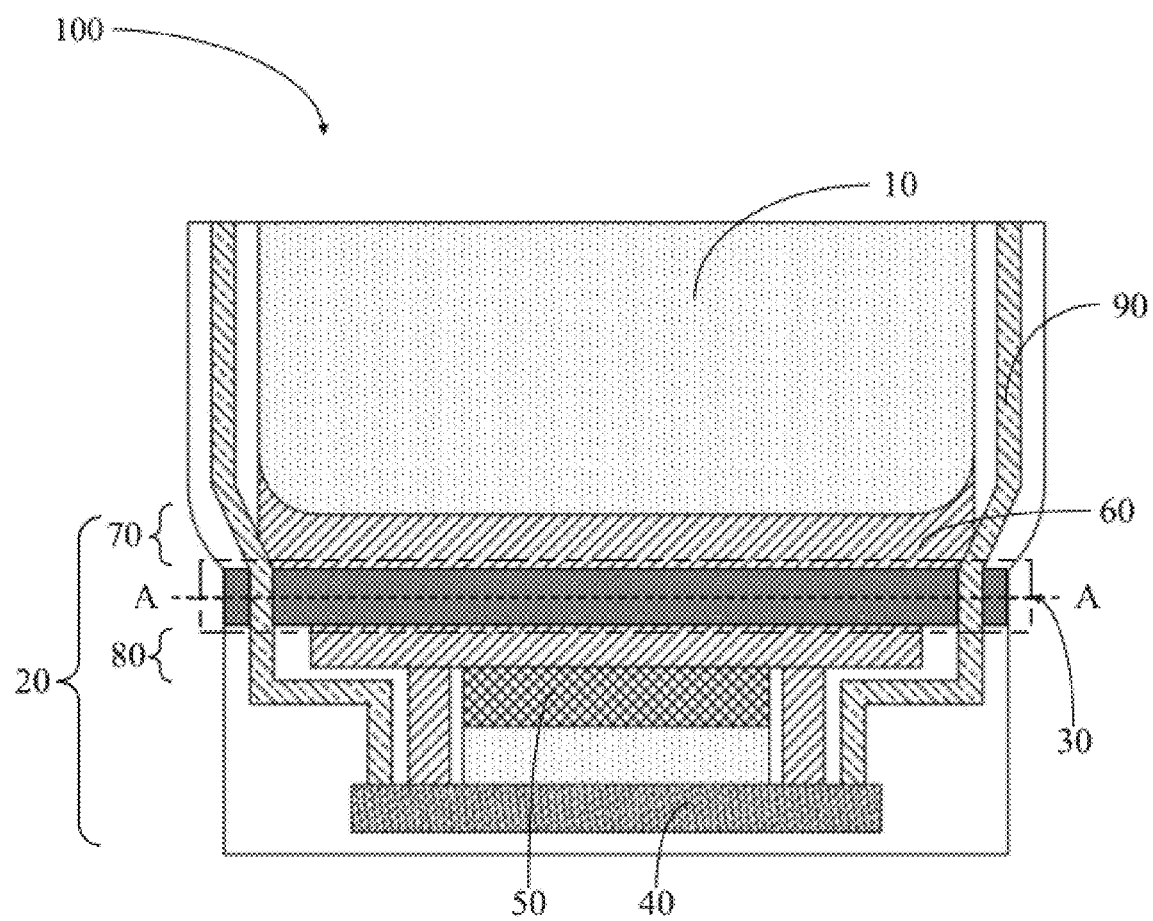
FIG. 4 shows a top view of a display panel according to EMBODIMENT TWO of the present disclosure.

Please refer to FIG. 4, which shows a top view of a display panel according to EMBODIMENT TWO of the present disclosure.

The display panel 100 includes a display area 10 and a non-display area 20 surrounding the display area. The non-display area 20 includes a bending area 30 adjacent to the display area 10 and a bonding area 40 away from the display area 10.

The display panel 100 further includes a power line. The power line extends from the display area 10 to the non-display area 20. The power line includes a first type of power line 50 and a second type of power line 60 positioned in the bending area 30. The first type of power line 50 and the second type of power line 60 are disposed at different layers in the bending area 30.

As can be seen in FIG. 4, the non-display area 20 includes a first region 70 and a second region 80 positioned at two sides of the bending area 30. The first region 70 is adjacent to the display area 10, and the second region 80 is away from the display area 10.

The power line includes a first uniform voltage portion positioned in the first region 70 and a second uniform voltage portion positioned in the second region 80. The first uniform voltage portion and the second uniform voltage portion extend towards the bonding area 40.

In one embodiment, the first type of power line 50 and the second type of power line 60 are positioned in the first region 70 and the second region 80. The first type of power line 50 and the second type of power line 60 are disposed at different layers in the first region 70 and the second region 80.

The power line includes a VDD signal line and a data signal line.

The first type of power line 50 is one of the VDD signal line and the data signal line, and the second type of power line 60 is the other of the VDD signal line and the data signal line.

The VDD signal line includes a VDD uniform voltage portion positioned in the bending area 30. The data signal line includes a data uniform voltage portion positioned in the bending area 30.

In one embodiment, the VDD signal line and the data signal line are disposed at different layers. At least one insulation layer is disposed between the first type of power line 50 and the second type of power line 60 to insulate the same from each other and to prevent occurrence of short connection therebetween.

In one embodiment, the insulation layer includes an organic layer made of organic material.

Because the first type of power line 50 and the second type of power line 60 are disposed at different layers, arrangement of the data and signal lines positioned in the first region 70 is simplified, and an interval W between the central line A-A of the display area 10 and the bending area 30 is shortened. Therefore, a narrow edge frame design is realized.

Figure 5:
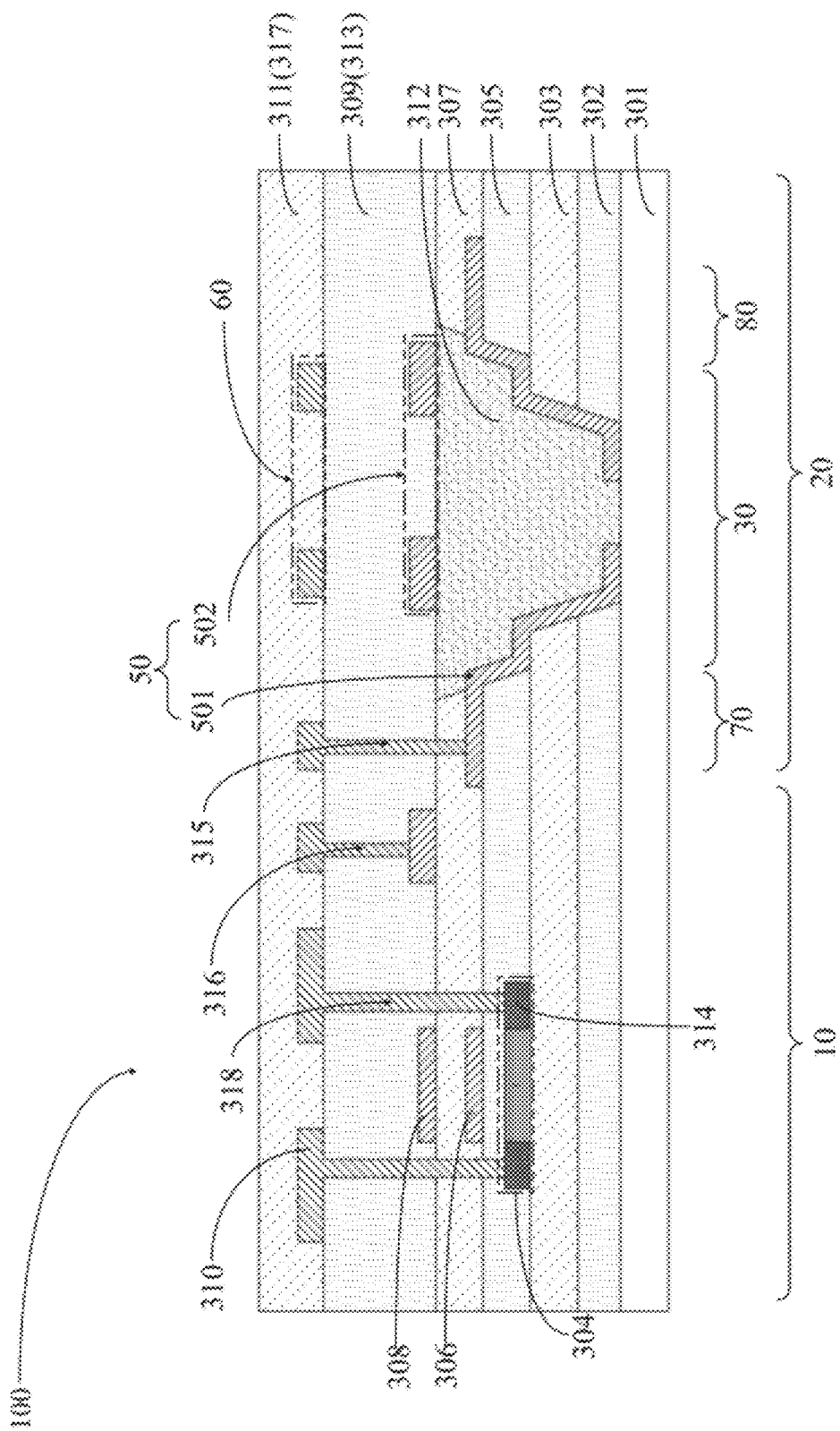
FIG. 5 shows a cross-sectional view of a structure of the display panel according to EMBODIMENT TWO of the present disclosure.

Please refer to FIG. 5, which shows a cross-sectional view of a structure of the display panel according to EMBODIMENT TWO of the present disclosure.

A substrate 301 and a thin film transistor (TFT) layer disposed on the substrate 301 are positioned in the display area 10. The TFT layer includes a barrier layer 302, a buffer layer 303, an active layer 304, a first gate insulation layer 305, a first metal layer 306, a second gate insulation layer 307, a second metal layer 308, an interlayer dielectric layer 309, a third metal layer 310, and a planarization layer 311.

In one embodiment, the substrate 301 is a flexible substrate. The flexible substrate is made of material including polyimide.

The barrier layer 302 is disposed on the substrate 301.

In one embodiment, the barrier layer 302 has a thickness of 700 nm.

In one embodiment, the barrier layer 302 is made of material including silicon oxide.

The buffer layer 303 is formed on the barrier layer 302, so as to serve as a buffer to release stress between heterostructures of different layers, and to function to block water and oxygen.

In one embodiment, the buffer layer 303 has a thickness of 550 nm.

In one embodiment, the buffer layer 303 is made of material including silicon nitride, silicon oxide, or combination thereof.

The active layer 304 is formed on the buffer layer 303. The active layer 304 includes a doped region 314 that is doped with ions.

In one embodiment, the active layer 304 has a thickness of 50 nm.

The first gate insulation layer 305 is formed on the active layer 304. The first gate insulation layer 305 covers the active layer 304. The first gate insulation layer 305 is configured to insulate the active layer 304 from the metal layer disposed above the active layer 304.

In one embodiment, the first gate insulation layer 305 has a thickness of 130 nm.

The first metal layer 306 is formed on the first gate insulation layer 305.

The first metal layer 306 functions as a gate electrode of the display panel 100. The gate electrode is made of metal, such as molybdenum, aluminum, an aluminum-nickel alloy, a molybdenum-tungsten alloy, chromium, copper, or any combinations thereof.

In one embodiment, the first metal layer 306 is made of molybdenum.

In one embodiment, the first metal layer 306 has a thickness of 250 nm.

The second gate insulation layer 307 is formed on the first metal layer 306. The second gate insulation layer 307 is configured to insulate the first metal layer 306 from the second metal layer 308.

In one embodiment, the first gate insulation layer 305 and the second gate insulation layer 307 are made of silicon nitride, silicon oxide, or silicon oxynitride.

In one embodiment, the second gate insulation layer 307 has a thickness of 110 nm.

The second metal layer 308 is formed on the second gate insulation layer 307.

In one embodiment, the thickness and the material of the second metal layer 308 could be the same as that of the first metal layer 306.

The interlayer dielectric layer 309 is formed on the second metal layer 308. The interlayer dielectric layer 309 covers the second metal layer 308, and is configured to insulate the second metal layer 308 from the third metal layer 310.

In one embodiment, the interlayer dielectric layer 309 is made of material that is the same as material used to form the first gate insulation layer 305 and the second gate insulation layer 307.

In one embodiment, the interlayer dielectric layer 309 has a thickness of 1.5 μm.

The third metal layer 310 is formed on the interlayer dielectric layer 309.

The third metal layer 310 functions as a source and drain electrode of the display panel 100. The source and drain electrode is made of metal, such as molybdenum, an aluminum, aluminum-nickel alloy, a molybdenum-tungsten alloy, chromium, copper, a titanium-aluminum alloy, or any combinations thereof.

The third metal layer 310 is electrically connected to the doped region 314 via a third through-hole 318.

In one embodiment, the third metal layer 310 is made of a titanium-aluminum alloy.

In one embodiment, for the third metal layer 310, a first layer therein that is made of titanium has a thickness of 80 nm, a second layer therein that is made of aluminum has a thickness of 600 nm, and a third layer therein that is made of titanium has a thickness of 80 nm.

The planarization layer 311 is formed on the third metal layer 310 to ensure a planar surface of a layered structure of array substrate.

The display panel 100 further includes a light-emitting device layer (not shown) and an encapsulation layer (not shown) formed on the planarization layer 311.

A part of the source and drain electrode is electrically connected to the first metal layer 306 via a first through-hole 315, such that the data and signals in the source and drain electrode are transmitted to a driver chip positioned in the bonding area 40 via the first metal layer 306.

A part of the source and drain electrode is electrically connected to the second metal layer 308 via a second through-hole 316, such that the data and signals in the source and drain electrode are transmitted to the driver chip positioned in the bonding area 40 via the second metal layer 308.

Please refer to FIG. 5. The substrate 301, a first signal line 501 disposed on the substrate 301, a first organic filling layer 312 disposed on the first signal line 501, a second signal line 502 disposed on the first organic filling layer 312, a second organic filling layer 313 (i.e., the interlayer dielectric layer 309 in FIG. 5) disposed on the second signal line 502, a second type of power line 60 disposed on the second organic filling layer 313, and a third organic filling layer 317 (i.e., the planarization layer 311 in FIG. 5) disposed on the second type of power line 60 are positioned in the bending area 30. In one embodiment, the first signal line 501 and the second signal line 502 constitute a first type of power line 50.

The depth of hole that is filled with the first organic filling layer 312 is equal to the interval between the substrate 301 and the second organic filling layer 313.

In one embodiment, the first organic filling layer 312 has a thickness of 1.49 μm. The second organic filling layer 313 and the interlayer dielectric layer 309 are disposed at the same layer. The third organic filling layer 317 and the planarization layer 311 are disposed at the same layer.

In one embodiment, the first signal line 501 and the first metal layer 306 are formed in a same photomask process, and the second signal line 502 and the second metal layer 308 are formed in a same photomask process. The second type of power line 60 and the third metal layer 310 are formed in a same photomask process.

In one embodiment, the first signal line 501 is a first data signal line, and the first data signal line and the first metal layer 306 are formed in as same photomask process. The second signal line 502 is a second data signal line, and the second data signal line and the second metal layer 308 are formed in as same photomask process. The second type of power line 60 is a VDD signal line, and the VDD signal line and the third metal layer 310 are formed in as same photomask process.

The first data signal line and the second data signal line extend from the display area 10 to the non-display area 20, and extend from the side adjacent to the substrate 301 to the bending area 30 via the data uniform voltage portion, and is connected to the bonding area 40.

Please see FIG. 4. The display panel 100 further includes a VSS signal line 90.

The VSS signal line 90 is disposed at an outer region of the non-display area 20, and is close to peripheral circumference of an edge frame of the display panel 100. The VSS signal line 90 extends from the display area to the bonding area 40 by passing through the bending area 30.

In one embodiment, the VSS signal line 90 and the VDD signal line are formed in a same photomask process. The VSS signal line 90 and the third metal layer 310 are formed in a same photomask process. The VSS signal line 90 directly crosses the bending area 30 from the display area 10 and extends towards the bonding area 40. The VSS signal line 90 and the VDD signal line positioned in the bending area 30, after being patterned, facilitate in reducing stress generated by bending of signal lines, thus avoiding break of metal lines.

The display panel 100 further includes a gate driver on array (GOA) signal line (not shown).

The GOA signal line is positioned at two sides of the display panel 100, and is positioned between the display area 10 and the VSS signal line 90.

The GOA signal line extends from the display area 10 to the non-display area 20. The GOA signal line is insulated from the VSS signal line 90, the data signal line, and the VDD signal line.

According to the present disclosure, the data signals in the display panel 100 are transmitted to the driver chip positioned in the bonding area 40 via the first signal line 501 and the second signal line 502. The VDD signals are transmitted to the driver chip positioned in the bonding area 40 via the second type of power line 60. Therefore, the signals are transmitted at different layers. This not only avoids occurrence of short connection but also signal interference between the VDD signal line and the data signal line.

A method for manufacturing the display panel according to EMBODIMENT TWO of the present disclosure is provided below.

Please refer to FIGS. 6A-6G, which show each stage in a process flow of a method for manufacturing the display panel according to EMBODIMENT TWO of the present disclosure.

Figure 6A:
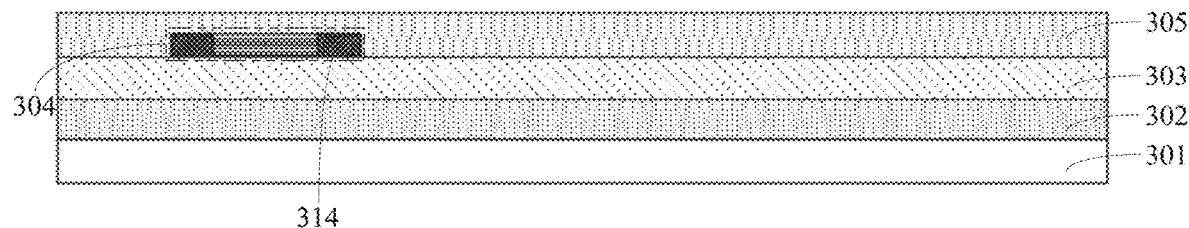
FIGS. 6A, 6B, 6C, 6D, 6E, 6F, and 6G show each stage in a process flow of a method for manufacturing the display panel according to EMBODIMENT TWO of the present disclosure.

Please see FIG. 6A. The substrate 301 is provided. The barrier layer 302, the buffer layer 303, the active layer 304, and the first gate insulation layer 305 are sequentially formed on the substrate 301.

In one embodiment, the substrate 301 is a flexible substrate. The flexible substrate is made of material including polyimide.

The barrier layer 302 is disposed on the substrate 301.

In one embodiment, the barrier layer 302 has a thickness of 700 nm.

In one embodiment, the barrier layer 302 is made of material including silicon oxide.

The buffer layer 303 is formed on the barrier layer 302, so as to serve as a buffer to release stress between heterostructures of different layers, and to function to block water and oxygen.

In one embodiment, the buffer layer 303 has a thickness of 550 nm.

In one embodiment, the buffer layer 303 is made of material including silicon nitride, silicon oxide, or combination thereof.

The active layer 304 is formed on the buffer layer 303. The active layer 304 includes the doped region 314 that is doped with ions.

In one embodiment, the active layer 304 has a thickness of 50 nm.

The first gate insulation layer 305 is formed on the active layer 304. The first gate insulation layer 305 covers the active layer 304. The first gate insulation layer 305 is configured to insulate the active layer 304 from the metal layer disposed above the active layer 304.

In one embodiment, the first gate insulation layer 305 has a thickness of 130 nm.

Figure 6B:
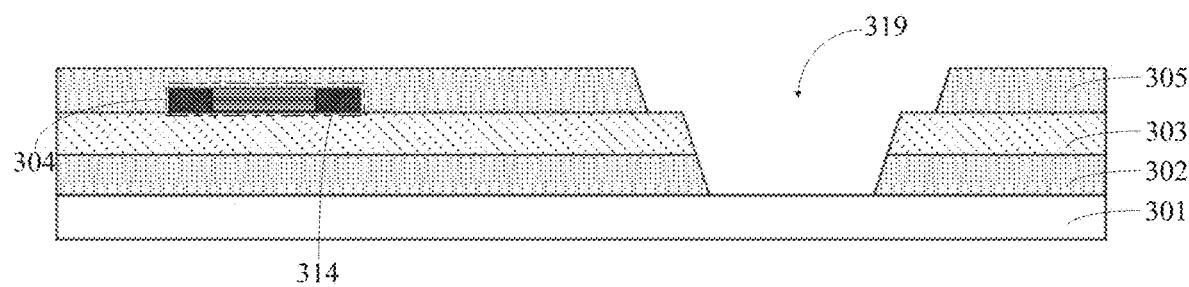

Please see FIG. 6B. A first recess 319 is formed in the bending area 30.

In one embodiment, the depth of the first recess 319 is equal to the sum of depth of the barrier layer 302, the buffer layer 303, and the first gate insulation layer 305.

In one embodiment, the opening area of the first recess 319 is gradually reduced in the direction extending from the first gate insulation layer 305 to the substrate 301.

Figure 6C:
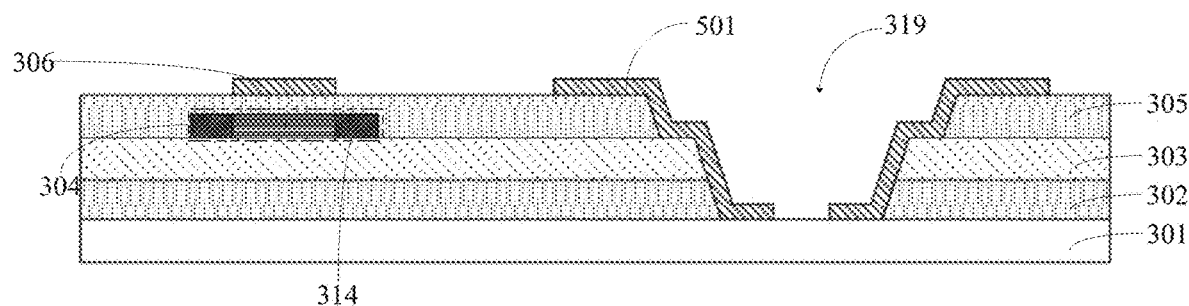

Please see FIG. 6C. The first metal layer 306 and the first signal line 501 positioned in the bending area 30 are simultaneously formed on the first gate insulation layer 305.

The first metal layer 306 functions as a gate electrode of the display panel 100. The gate electrode is made of metal, such as molybdenum, aluminum, an aluminum-nickel alloy, a molybdenum-tungsten alloy, chromium, copper, or any combinations thereof.

In one embodiment, the first metal layer 306 is made of molybdenum.

In one embodiment, the first metal layer 306 has a thickness of 250 nm.

In one embodiment, the first signal line 501 is a first data signal line. The first data signal line and the first metal layer 306 are formed in a same photomask process.

Figure 6D:
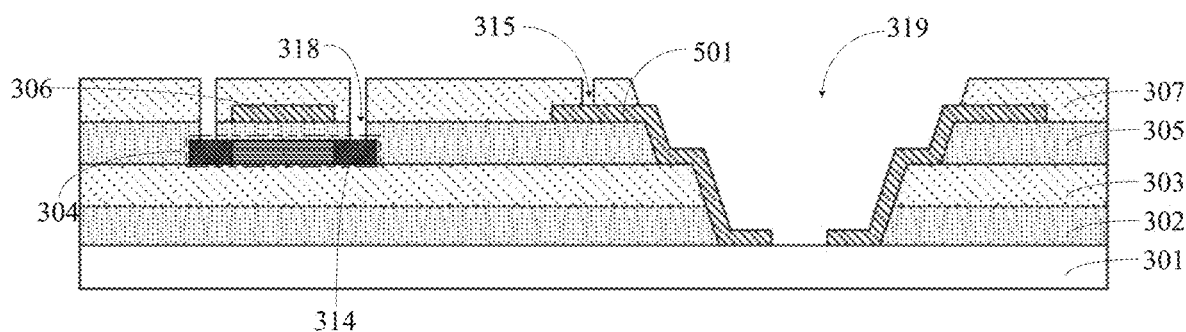

Please see FIG. 6D. The second gate insulation layer 307 and the first through-hole 315 and the third through-hole 318 are formed on the first metal layer 306, wherein the second gate insulation layer 307 does not cover the recess 319.

The second gate insulation layer 307 is configured to insulate the first metal layer 306 from the second metal layer 308.

In one embodiment, the first gate insulation layer 305 and the second gate insulation layer 307 are made of silicon nitride, silicon oxide, or silicon oxynitride.

In one embodiment, the second gate insulation layer 307 has a thickness of 110 nm.

Figure 6E:
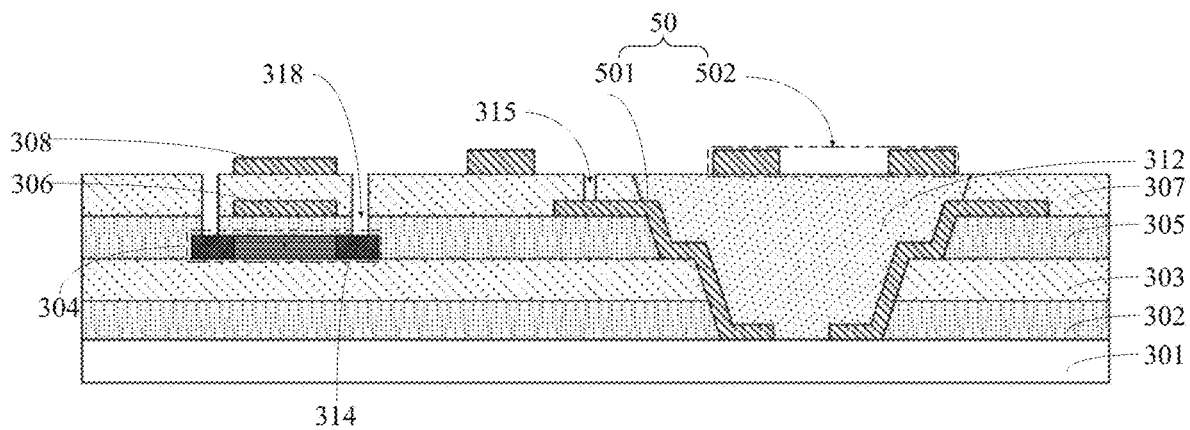

Please see FIG. 6E. The first recess 319 is filled with the first organic filling layer 312, wherein the first organic filling layer 312 has a top surface flush with the top surface of the second gate insulation layer 307. In addition, a second metal layer 308 and the second signal line 502 disposed on the first organic filling layer 312 are simultaneously on the second gate insulation layer 307.

In one embodiment, the first signal line 501 and the second signal line 502 constitute a first type of power line 50.

The second signal line 502 is a second data signal line. The second data signal line and the second metal layer 308 are formed in a same photomask process.

The first recess 319 filled with the first organic filling layer 312 is equal to the interval between the substrate 301 and the second organic filling layer 313.

In one embodiment, the first organic filling layer 312 has a thickness of 1.49 μm.

Figure 6F:
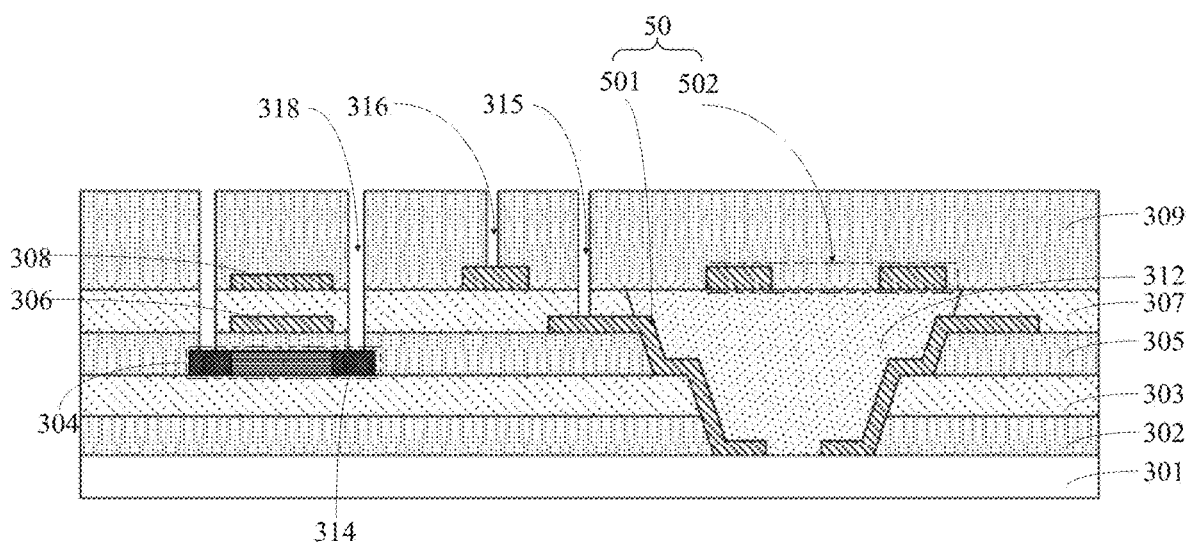

Please see FIG. 6F. The interlayer dielectric layer 309 and the second through-hole 316 are formed on the second metal layer 308. The first through-hole 315 and the third through-hole 318 are not covered by the insulation material.

The second organic filling layer 313 and the interlayer dielectric layer 309 are disposed at the same layer. That is, the interlayer dielectric layer 309 positioned in the bending area 30 could be used as the second organic filling layer 313.

Figure 6G:
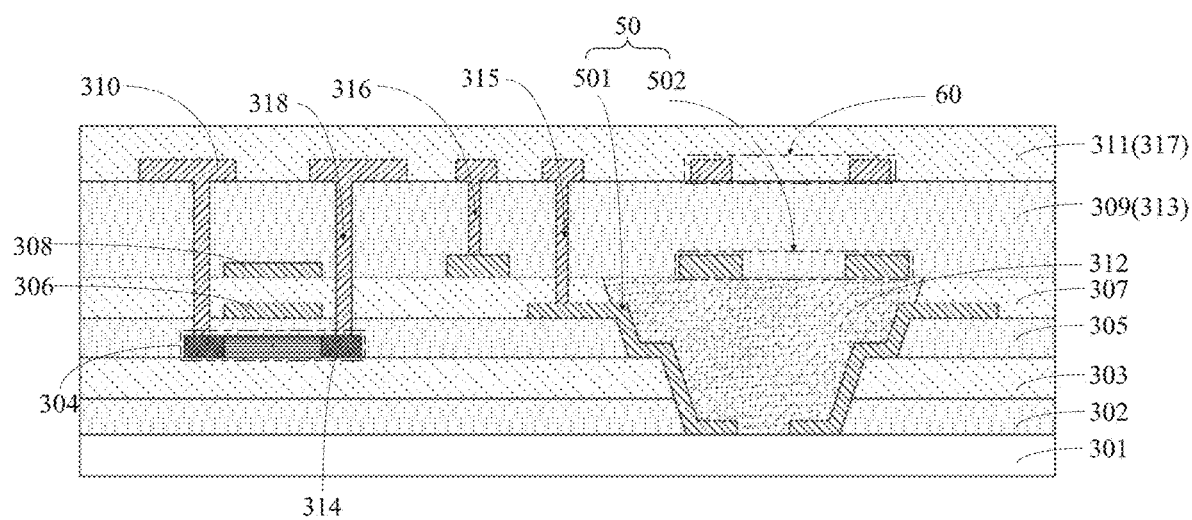

Please see FIG. 6G. The third metal layer 310 and the second type of power line 60 positioned in the bending area 30 are simultaneously formed on the interlayer dielectric layer 309.

The third metal layer 310 functions as a source and drain electrode of the display panel 100. The source and drain electrode is made of metal, such as molybdenum, aluminum, an aluminum-nickel alloy, a molybdenum-tungsten alloy, chromium, copper, a titanium-aluminum alloy, or any combinations thereof.

The third metal layer 310 is electrically connected to the doped region 314 via the third through-hole 318.

In one embodiment, the third metal layer 310 is made of a titanium-aluminum alloy.

In one embodiment, for the third metal layer 310, a first layer therein that is made of titanium has a thickness of 80 nm, a second layer therein that is made of aluminum has a thickness of 600 nm, and a third layer therein that is made of titanium has a thickness of 80 nm.

A part of the source and drain electrode is electrically connected to the first metal layer 306 via the first through-hole 315, such that the data and signals in the source and drain electrode are transmitted to the driver chip positioned in the bonding area 40 via the first metal layer 306.

A part of the source and drain electrode is electrically connected to the second metal layer 308 via the second through-hole 316, such that the data and signals in the source and drain electrode are transmitted to the driver chip positioned in the bonding area 40 via the second metal layer 308.

Finally, the planarization layer 311 is formed on the third metal layer 310, and the light-emitting device layer (not shown) and the encapsulation layer (not shown) are formed on the planarization layer 211.

In addition, the present disclosure provides a display module. The display module includes a display panel, and a touch control layer, a polarizer layer and a cover layer disposed on the display panel. An encapsulation layer is attached to the touch control layer by a first optical clear adhesive (OCA) layer. The polarizer layer is attached to the cover layer by a second optical clear adhesive (OCA) layer.

The working principle of the display module is similar to that of the display panel. Thus, please refer to the working principle of the display panel, and the working principle of the display module is omitted.

The present disclosure provides a display panel and a display module. The display panel includes:

a display area;

a non-display area surrounding the display area, wherein the non-display area includes a bending area adjacent to the display area and a bonding area away from the display area; and a power line, wherein the power line includes a first type of power line and a second type of power line positioned in the bending area;

wherein the first type of power line and the second type of power line are disposed at different layers in the bending area.

According to the present disclosure, the VDD signal line and the data signal line are disposed at different layers. Therefore, the interval between the display area and the bending area is shortened, thus further narrowing the lower edge frame of display panels.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A display panel, comprising:

a display area;

a non-display area surrounding the display area, wherein the non-display area includes a bending area adjacent to the display area and a bonding area away from the display area;

a power line, wherein the power line includes a first type of power line and a second type of power line positioned in the bending area; and at least one insulation layer disposed between the first type of power line and the second type of power line to insulate the first type of power line and the second type of power line from each other;

wherein the first type of power line and the second type of power line are disposed at different layers in the bending area, and the first type of power line is one of a first constant voltage (VDD) signal line or a data signal line, and the second type of power line is the other of the first constant voltage (VDD) signal line or the data signal line;

wherein the first type of power line includes a first signal line and a second signal line;

wherein a substrate, the first signal line disposed on the substrate, a first organic filling layer disposed on the first signal line, the second signal line disposed on the first organic filling layer, a second organic filling layer disposed on the second signal line, the second type of power line disposed on the second organic filling layer, and a third organic filling layer disposed on the second type of power line are positioned in the bending area;

wherein the substrate, a first metal layer disposed on the substrate, a second metal layer disposed on the first metal layer, and a third metal layer disposed on the second metal layer are positioned in the display area; and wherein the first signal line and the first metal layer are formed in a same photomask process, the second signal line and the second metal layer are formed in a same photomask process, and the second type of power line and the third metal layer are formed in a same photomask process.

2. The display panel according to claim 1, wherein the non-display area includes a first region and a second region positioned at two sides of the bending area, the first region is adjacent to the display area, and the second region is away from the display area; and wherein the power line includes a first uniform voltage portion positioned in the first region and a second uniform voltage portion positioned in the second region, and the first uniform voltage portion and the second uniform voltage portion extend towards the bonding area.

3. The display panel according to claim 1, wherein the first type of power line is the first constant voltage (VDD) signal line, and the second type of power line is the data signal line.

4. The display panel according to claim 1, wherein the first type of power line is the data signal line, and the second type of power line is the first constant voltage (VDD) signal line; and wherein the first constant voltage (VDD) signal line and the data signal line extend from the bending area to the bonding area.

5. The display panel according to claim 1, wherein the display panel further comprises a second constant voltage (VSS) signal line, and the second constant voltage (VSS) signal line extends from the display area to the bonding area; and wherein the second constant voltage (VSS) signal line and the first constant voltage (VDD) signal line are formed in a same photomask process.

6. The display panel according to claim 5, wherein display panel further comprises a gate driver on array (GOA) signal line;

wherein the GOA signal line is positioned at two sides of the display panel, and is positioned between the display area and the second constant voltage (VSS) signal line;

wherein the GOA signal line extends from the display area to the non-display area; and wherein the GOA signal line is insulated from the second constant voltage (VSS) signal line, the data signal line, and the first constant voltage (VDD) signal line.

7. A display module, wherein the display module comprises a display panel and a polarizer layer and a cover layer disposed on the display panel, the display panel comprising:

a display area;

a non-display area surrounding the display area, wherein the non-display area includes a bending area adjacent to the display area and a bonding area away from the display area;

a power line, wherein the power line includes a first type of power line and a second type of power line positioned in the bending area; and at least one insulation layer disposed between the first type of power line and the second type of power line to insulate the first type of power line and the second type of power line from each other;

wherein the first type of power line and the second type of power line are disposed at different layers in the bending area, and the first type of power line is one of a first constant voltage (VDD) signal line or a data signal line, and the second type of power line is the other of the first constant voltage (VDD) signal line or the data signal line;

wherein the first type of power line includes a first signal line and a second signal line;

a substrate, the first signal line disposed on the substrate, a first organic filling layer disposed on the first signal line, the second signal line disposed on the first organic filling layer, a second organic filling layer disposed on the second signal line, the second type of power line disposed on the second organic filling layer, and a third organic filling layer disposed on the second type of power line are positioned in the bending area;

wherein the substrate, a first metal layer disposed on the substrate, a second metal layer disposed on the first metal layer, and a third metal layer disposed on the second metal layer are positioned in the display area; and wherein the first signal line and the first metal layer are formed in a same photomask process, the second signal line and the second metal layer are formed in a same photomask process, and the second type of power line and the third metal layer are formed in a same photomask process.

8. The display module according to claim 7, wherein the non-display area includes a first region and a second region positioned at two sides of the bending area, the first region is adjacent to the display area, and the second region is away from the display area; and wherein the power line includes a first uniform voltage portion positioned in the first region and a second uniform voltage portion positioned in the second region, and the first uniform voltage portion and the second uniform voltage portion extend towards the bonding area.

9. The display module according to claim 7, wherein the first type of power line is the first constant voltage (VDD) signal line, and the second type of power line is the data signal line.

10. The display module according to claim 7, wherein the first type of power line is the data signal line, and the second type of power line is the first constant voltage (VDD) signal line; and wherein the first constant voltage (VDD) signal line and the data signal line extend from the bending area to the bonding area.

11. The display module according to claim 7, wherein the display panel further comprises a second constant voltage (VSS) signal line, and the second constant voltage (VSS) signal line extends from the display area to the bonding area; and wherein the second constant voltage (VSS) signal line and the first constant voltage (VDD) signal line are formed in a same photomask process.

12. The display module according to claim 11, wherein the display panel further comprises a gate driver on array (GOA) signal line;

wherein the GOA signal line is positioned at two sides of the display panel, and is positioned between the display area and the second constant (VSS) signal line;

wherein the GOA signal line extends from the display area to the non-display area; and wherein the GOA signal line is insulated from the second constant (VSS) signal line, the data signal line; and the first constant voltage (VDD) signal line.

* * * * *